US008786129B2

(12) United States Patent
Sakuma

(10) Patent No.: US 8,786,129 B2
(45) Date of Patent: Jul. 22, 2014

(54) CONTROL DEVICE FOR LIGHTING LED AND DETECTING BREAKAGE THEREOF

(71) Applicant: Yoichi Sakuma, Aichi (JP)

(72) Inventor: Yoichi Sakuma, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 0 days.

(21) Appl. No.: 13/800,137

(22) Filed: Mar. 13, 2013

(65) Prior Publication Data

US 2013/0241410 A1 Sep. 19, 2013

(30) Foreign Application Priority Data

Mar. 13, 2012 (JP) ................................ 2012-056454

(51) Int. Cl.
*B60L 1/14* (2006.01)

(52) U.S. Cl.
USPC ............................ 307/10.8; 315/82; 315/308

(58) Field of Classification Search
CPC ........ B60L 1/14; H05B 37/02; H05B 37/032; H05B 37/036; H05B 33/0842; H05B 33/0881; B60Q 1/2607
USPC ............ 315/77, 82, 291, 308; 307/10.1, 10.8
See application file for complete search history.

(56) References Cited

U.S. PATENT DOCUMENTS

| | | | | |
|---|---|---|---|---|
| 5,661,645 | A * | 8/1997 | Hochstein | 363/89 |
| 6,836,081 | B2 * | 12/2004 | Swanson et al. | 315/307 |
| 6,949,892 | B2 * | 9/2005 | Horiuchi et al. | 315/308 |
| 8,193,789 | B2 * | 6/2012 | Bayat et al. | 323/276 |
| 2012/0074856 | A1 | 3/2012 | Takata et al. | |

FOREIGN PATENT DOCUMENTS

| | | | |
|---|---|---|---|
| JP | 8-332897 | A | 12/1996 |
| JP | 2008-168706 | A | 7/2008 |
| JP | 2010-105590 | A | 5/2010 |
| JP | 2010-287601 | A | 12/2010 |
| JP | 2011-098620 | A | 5/2011 |

* cited by examiner

*Primary Examiner* — Thuy Vinh Tran
(74) *Attorney, Agent, or Firm* — Osha Liang LLP

(57) ABSTRACT

A control device includes a plurality of LED arrays connected in parallel to one another, each of the plurality of LED arrays including one or more LEDs connected in series and a resistance element connected in series to the LEDs, a voltage application circuit that applies a voltage to the plurality of LED arrays, a switching element disposed between the plurality of LED arrays and a ground, a voltage detection circuit having an end connected between the switching element and the plurality of LED arrays, a capacitor having an end connected between the switching element and the plurality of LED arrays, and another end connected to the ground, and a control circuit that controls the voltage outputted from the voltage application circuit and switching of conduction states of the switching element, and reads a voltage from the voltage detection circuit.

20 Claims, 7 Drawing Sheets

CONTROL DEVICE FOR LIGHTING LED AND DETECTING BREAKAGE THEREOF

BACKGROUND OF THE INVENTION

1. Technical Field

The present invention relates to a control device for lighting a lamp and detecting a breakage of the lamp, and in particular to a control device for lighting a lamp composed of a light emitting diode (LED) and detecting a breakage of the lamp.

2. Related Art

If a vehicle lamp, such as a front light, a direction indicator or a stop lamp, is not lighted due to the breakage thereof, the driver has trouble with driving at night or cannot show his/her intention of changing a running direction of the vehicle or stopping it to other surrounding vehicles. In order to avoid such troubles, techniques for detecting a breakage of a vehicle light have been contemplated so far. For example, JP 08-332897 A discloses a technique for detecting respective voltages of lighting lamps connected to a control unit, and determining which lamp is broken based on variations in the resistances of the lamps.

On the other hand, lately, LEDs have been increasingly used as light sources for lamps provided in vehicles or facilities, because of their low electricity consumption.

For example, JP 2010-105590A discloses an LED breakage detection device that aims to detect a breakage of an LED without lighting the LED. The LED breakage detection device is configured to supply an LED with a pulse signal having a pulse duration that is set so as not to light the LED and to detect presence or absence of a breakage of the LED while the pulse signal is being supplied to the LED.

JP 2011-98620 A discloses a breakage detection device that aims to detect a breakage of a luminous element stably with a simple configuration. The breakage detection device includes: first and second resistance elements connected in series; third and fourth resistance elements connected in series and having one end connected to a signal input terminal from a vehicle side and the other end connected to the collector of an NPN transistor; a PNP transistor having the base connected to a connection node of the third and fourth resistance elements and the emitter connected to the signal input terminal; a diode having the anode connected to the collector of the PNP transistor; a fifth resistance element having one end connected to the cathode of the diode and the other end connected to the ground terminal; and a capacitative element having one end connected to the cathode of the diode and the other end connected to the ground terminal.

JP 2010-287601 A discloses a luminous element driver device that aims to reliably and readily detect a short or breakage failure of luminous elements used for a backlight source of LCD-TV or the like. The luminous element driver device monitors respective voltages at connection nodes of a driver circuit and luminous element arrays, each of which has luminous elements connected in series, and includes maximum and minimal detection units that detect the maximum and minimal ones of the monitored voltages, respectively. Further, the luminous element driver device compares a difference between the maximum and minimal voltages with a predetermined reference voltage, thereby detecting a short or breakage of each luminous element.

JP 2008-168706 A discloses a light source unit group lighting device that aims to determine a failure of each LED in a turn lamp. When all LED units are in a non-broken state, the light source unit group lighting device lights all the LED units in response to lighting instruction signals inputted intermittently. Meanwhile, when at least one of the LED units is in a broken state, the light source unit group lighting device lights another non-broken LED unit during a certain time in response to the first one of lighting instruction signals inputted intermittently, and then lights it out. Subsequently, the light source unit group lighting device maintains all the LED units to be in a light-out state upon inputs of the second and subsequent ones of the lighting instruction signals.

However, it is more desirable to detect a breakage of an LED without making a user aware of the detection.

SUMMARY

One or more embodiments of the present invention provide a control device for lighting an LED and detecting a breakage of the LED, which is used to control a lamp including a plurality of LEDs, for example, in a vehicle, and which is capable of controlling lighting of the plurality of LEDs and detecting presence or absence of a breakage of each LED, thereby determining which LED is broken, without the necessity for a driver to light the LEDs, for example, upon getting in the vehicle.

In accordance with one aspect of the present invention, there is provided a control device that controls lighting of a plurality of LEDs and detects a breakage of each LED. According to one or more embodiments, the control device includes a plurality of LED arrays, a voltage application circuit, a switching element, a voltage detection circuit, a capacitor, and a control circuit. The plurality of LED arrays are connected in parallel to one another, and each of them includes one or more LED connected in series and a resistance element connected in series to the LEDs. The voltage application circuit applies a voltage to the plurality of LED arrays. The switching element is disposed between the plurality of LED arrays and a ground. The voltage detection circuit has an end connected between the switching element and the plurality of LED arrays. The capacitor has an end connected between the switching element and the plurality of LED arrays, and another end connected to the ground. The control circuit controls the voltage outputted from the voltage application circuit and switching of conduction states of the switching element, and reads a voltage from the voltage detection circuit. The resistance elements connected in series to the corresponding LEDs have different resistances from one another. Further, the control circuit renders the switching element be in a connection state, and outputs a command signal to the voltage application circuit to apply the voltage for lighting the LEDs, thereby lighting the LEDs. Meanwhile, the control circuit renders the switching element be a disconnection state, and outputs a command signal to the voltage application circuit to apply a rectangular wave pulse voltage having a pulse duration that does not cause the LEDs to be lighted, thereby detecting presence or absence of breakages of the LEDs in each LED array based on the voltage read from the voltage detection circuit and determining which of the LED arrays is broken.

This configuration makes it possible to control the lighting of the plurality of LEDs, and to detect presence or absence of a breakage of each LED, thereby determining which LED is broken, without lighting the LEDs.

According to one or more embodiments, the control circuit may bring the switching element into conduction, after reading the voltage from the voltage detection circuit.

This configuration makes it possible to discharge the electric charge from the capacitor promptly, thereby detecting presence or absence of a breakage of each LED for a short period.

According to one or more embodiments, the control circuit may read the voltage from the voltage detection circuit, after the rectangular wave pulse voltage having the pulse duration that does not cause the LEDs to be lighted becomes 0 V.

This configuration makes it possible to obtain the stable voltage, by reading the voltage after applying it to the capacitor is completed.

According to one or more embodiments, the control device may detect presence or absence of breakages of the LEDs in each LED array and determines which LED array is broken, by comparing the voltage read from the voltage detection circuit with a voltage threshold determined in advance based on respective resistances of the resistance elements.

This configuration makes it possible to reliably and promptly detect presence or absence of a breakage of each LED, thereby determining which LED is broken through the comparison using the voltage threshold determined theoretically in advance.

According to one or more embodiments, the control device may detect presence or absence of breakages of the LEDs in each LED array, based on a change in the voltage read from the voltage detection circuit.

This makes it possible to detect presence or absence of a breakage of each LED with a simple method.

According to one or more embodiments, during a period over which the control device is outputting a command signal to the voltage application circuit to continuously apply a rectangular pulse wave voltage having a pulse duration that causes the LEDs to be lighted, when this rectangular pulse wave voltage becomes 0 V, the control device may output the command signal to the voltage application circuit to apply the rectangular pulse wave voltage having the pulse duration that does not cause the LEDs to be lighted.

This configuration makes it possible to detect presence or absence of a breakage of each LED, thereby determining which LED is broken, even while the LEDs are being lighted intermittently or even while the LEDs are being lighted in a duty cycle which allows the human eye to perceive that each LED is being continuously lighted.

According to one or more embodiments, in the case where the plurality of LED arrays constitute a single lamp, when detecting a breakage of one of the plurality of LED arrays in the single lamp, the control circuit may increase the luminance of the LEDs constituting the LED arrays other than the broken one in the single lamp.

This configuration enables the lamp including the broken LED to temporally maintain the entire luminance until the broken LED is repaired, even when one of the LEDs is broken and loses its luminance.

According to one or more embodiments, the LEDs of the control device as described above may be provided in a vehicle.

According to one or more embodiments, by applying this configuration to a device that controls a lamp including a plurality of LEDs in a vehicle, it is possible to provide a control device for lighting an LED and detecting a breakage of the LED, which is capable of controlling the lighting of the plurality of LEDs, and detecting presence or absence of a breakage of each LED, thereby determining which LED is broken, without the necessary for a driver to light the LEDs, for example, upon getting in the vehicle.

According to one or more embodiments, it is possible to provide a control device for lighting an LED and detecting a breakage of the LED, which is capable of controlling lighting of a plurality of LEDs, and detecting presence or absence of a breakage of each LED, thereby determining which LED is broken, without lighting the LEDs.

DETAILED DESCRIPTION

Hereinafter, an embodiment of the present invention will be described, with reference to the accompanying drawings.

First Embodiment

Figure 1:
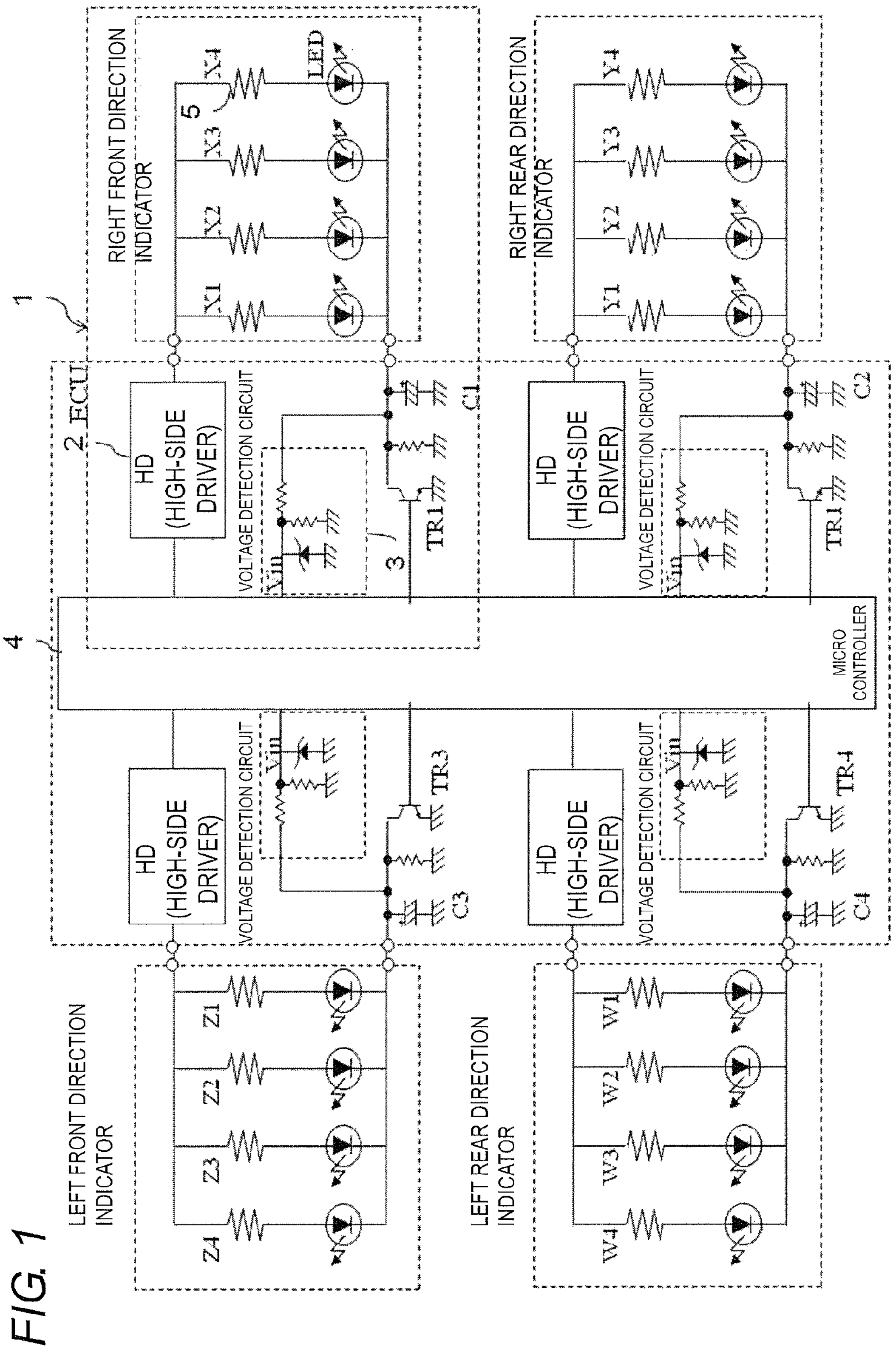
FIG. 1 is a circuit diagram of control devices according to a first embodiment of the present invention, when the control devices are applied to direction indicators in a vehicle.

FIG. 1 is a circuit diagram of control devices 1 according to the first embodiment of the present invention, when the control devices 1 are applied to direction indicators in a vehicle. The control devices 1 are provided corresponding to direction indicators installed at four locations, namely, at a right front, a left front, a right rear, and a left rear of a vehicle. In FIG. 1, the single control device 1 corresponding to the direction indicator at the right front is illustrated, but identical control devices 1 may be arranged corresponding to the direction indicators at the front left, right rear, and left rear. The control device 1 includes, for example, a voltage application circuit 2, a voltage detection circuit 3, and a control circuit 4, and they are provided in an electronic control unit (ECU) of a typical vehicle.

Figure 7:
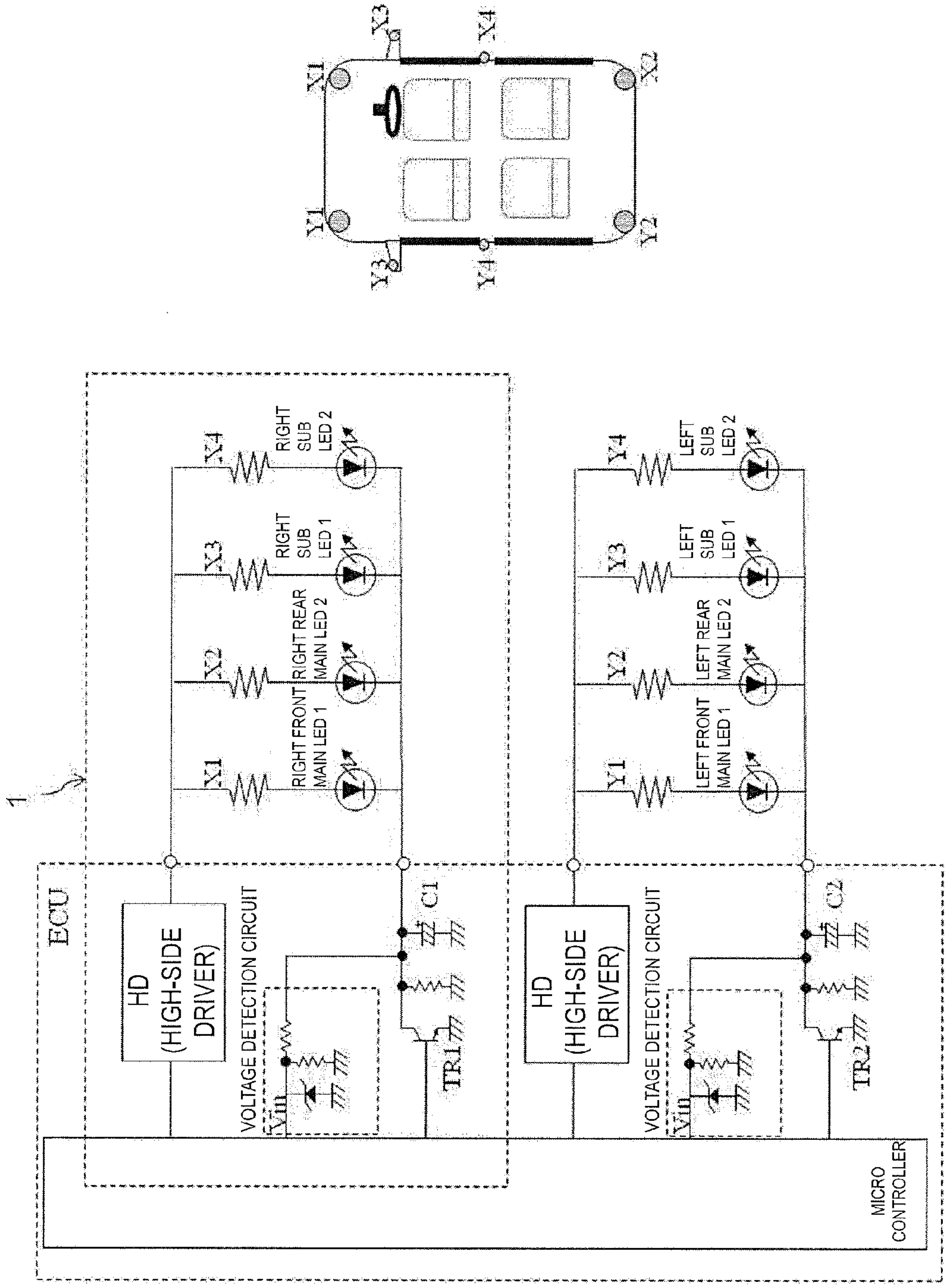
FIG. 7 is a circuit diagram of the control device, when a control device according to a modification of the first embodiment of the present invention is applied to direction indicators in a vehicle.

In FIG. 1, the single control device 1 corresponds to the direction indicator at the right front, and a plurality of LEDs are arranged in this direction indicator. However, there is no limitation on the installment of the control device 1 and the arrangement of the LEDs. Alternatively, as in a modification of the control device 1 illustrated in FIG. 7, for example, respective LEDs in the direction indicators at different locations, namely, a right front main LED 1, a right rear main LED 2, a right sub LED 1, and a right sub LED 2 may be arranged in parallel. Here, each main LED refers to a lamp in a main direction indicator provided at the front or rear of a vehicle, and each sub LED refers to a lamp other than a lamp in the main direction indicator, such as a lamp provided at a side mirror or a side body of a vehicle.

Figure 2:
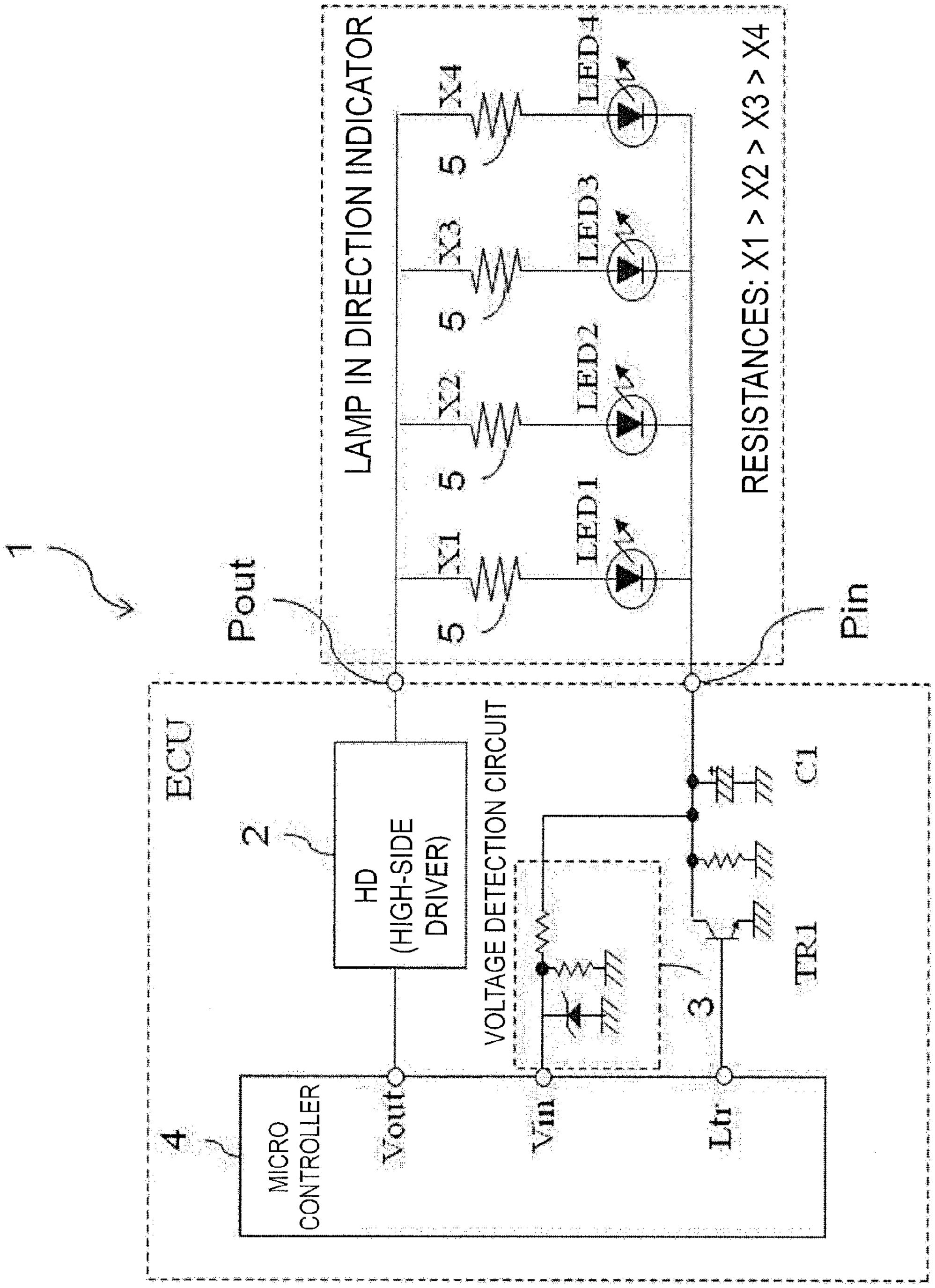
FIG. 2 is a circuit diagram of the control device according to the first embodiment of the present invention, which is applied to a lamp of a direction indicator of a vehicle and which controls a plurality of LEDs provided in parallel.

FIG. 2 is a circuit diagram of the control device 1 which controls a plurality of LEDs arranged in parallel in a lamp of a direction indicator for a vehicle. The control device 1 is a control device that is configured to control lighting of a plurality of LEDs and detect a breakage of each LED. The control device 1 is separated into two units that are disposed in an ECU and a lamp of a direction indicator, respectively, and the two units are connected to each other at points Pout and Pin. The unit of the control device 1 which is disposed in the ECU includes a voltage application circuit 2 (high-side driver), a voltage detection circuit 3, a control circuit 4 (micro controller), a transistor TR1, a capacitor C1, and a capacitor discharge resistance element. Meanwhile, the unit of the control device 1 which is disposed in the lamp of the direction indicator includes four LED arrays connected in parallel, each of which has a resistance element 5 and an LED connected in series. Needless to say, there is no limitation on the number of the LED arrays.

In FIG. 2, each LED array has the single LED, however there is no limitation on the number of LEDs in each LED array. Alternatively, a plurality of LEDs connected in series may be provided in each LED array. If a plurality of LEDs are arranged in series in each LED array, the cathode of an upstream LED is connected to the anode of a downstream LED in a current flow direction. The anode of the most upstream LED is connected to the resistance element 5, whereas the cathode of the most downstream LED is connected to the point Pin on the ground side.

The other terminal of the resistance element 5 in each LED array is connected to the point Pout on the power supply side. In this embodiment, the resistance element 5 is disposed upstream of the LEDs connected in series in each LED array in the current flow direction, but may be disposed downstream thereof. In this case, one terminal of the resistance element 5 is connected to the cathode of the most downstream one of the LEDs connected in series, whereas the other terminal thereof is connected to the point Pin on the ground side. The resistance elements 5 have different resistances from one another.

The control circuit 4 is configured as a part of an IC in a microcomputer. A terminal Vout of the control circuit 4 is connected to the voltage application circuit 2 functioning as a high-side driver, and controls the voltage application circuit 2. The voltage application circuit 2 applies the point Pout, or the LED arrays, with a voltage having a preset drive voltage and a preset pulse duration, under the control of the control circuit 4.

A terminal Vin of the control circuit 4 is connected to the voltage detection circuit 3, and detects a voltage drop across the lamp of the direction indicator which serves as a load between the points Pout and Pin, thus reading this dropped voltage. The control circuit 4 controls timing of reading the voltage at the terminal Vin. The voltage detection circuit 3 includes two resistance elements and a zener diode. A terminal of one of the resistance elements and a terminal of the zener diode are grounded, and the other of the resistance elements has one terminal connected to the load and the other terminal connected in common to the other terminals of the one resistance element and the zener diode and the terminal Vin. Here, the resistance of each resistance element may be determined optionally.

A terminal Ltr of the control circuit 4 is connected to the base of the switching element TR1 composed of a transistor, and controls switching of conduction states of the switching element TR1. Here, the switching element TR1 is not limited to a transistor, but the terminal Ltr also functions as a line controlling the switching of the switching element TR1 even when the switching element TR1 is composed of any other element. The emitter of the switching element TR1 is grounded, and the collector thereof is connected to the load. Accordingly, the switching element TR1 is disposed between each LED array and the ground.

The collector of the switching element TR1 is also connected in common to the terminal of the voltage detection circuit 3 on the load side. One end of the capacitor C1 is connected between the point Pin connected to the load and a node connected in common to both the collector of the switching element TR1 and the terminal of the voltage detection circuit 3 on the load side, whereas the other end of the capacitor C1 is grounded. Accordingly, one end of the voltage detection circuit 3 is connected between the switching element TR1 and each LED array, and one end of the capacitor C1 is connected between the switching element TR1 and each LED array. The capacitor discharge resistance element is provided, with one end thereof connected between the switching element TR1 and each LED array and the other end thereof grounded. Here, the capacitance of the capacitor C1 may be determined optionally, and the capacitor C1 may be either of a laminated ceramic capacitor and an electrolytic capacitor.

Figure 3A:
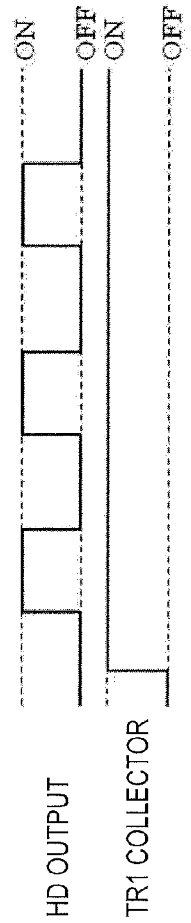
FIG. 3A is a timing diagram of a pulse signal and a switching element in the control device according to the first embodiment of the present invention which is applied to a direction indicator in a normal state.
Figure 3B:
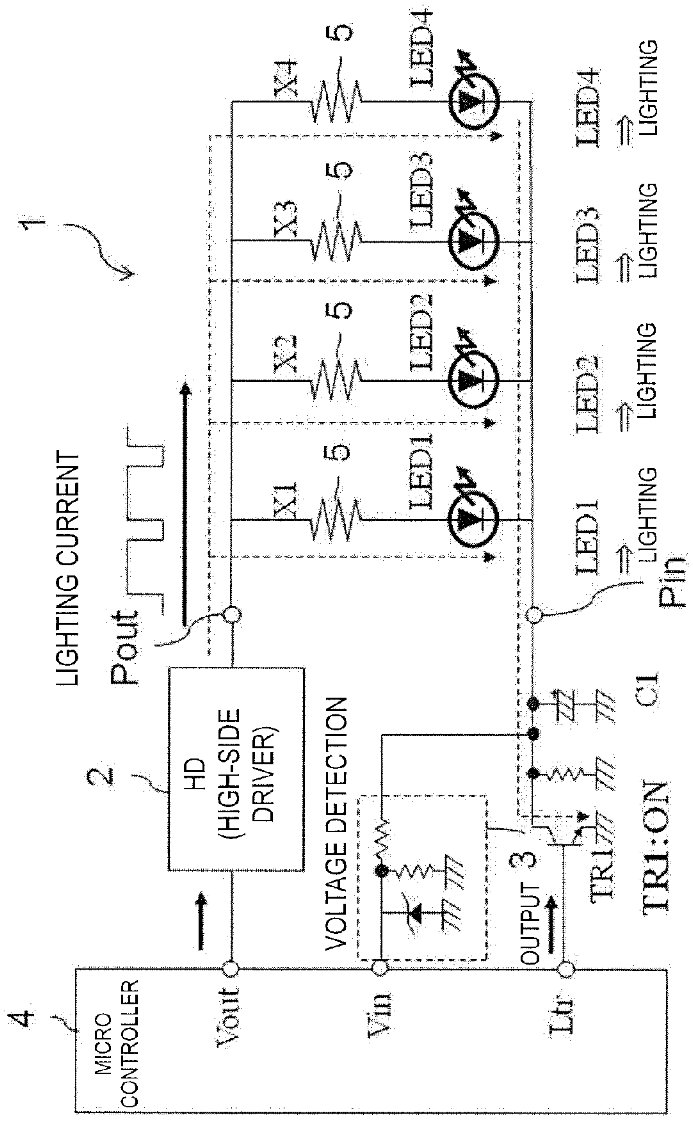
FIG. 3B is an explanatory circuit diagram of the control device.

Next, a description will be given of timing of a pulse signal and the switching element TR1 in a direction indicator and an operation of the control device 1 in a normal state, namely, in a case of lighting the direction indicator, with reference to FIGS. 3A and 3B. The control circuit 4 first turns ON the terminal Ltr, thereby bringing the switching element TR1 into conduction. As a result, the control device 1 is configured to supply a sufficient amount of current to the lamp of the direction indicator if a voltage is applied to the point Pout.

When a driver operates the direction indicator, the control circuit 4 outputs a command signal to the voltage application circuit 2, in order to control an ON/OFF operation of the lamp which conforms to a flashing frequency of the direction indicator. In response to the command signal, the voltage application circuit 2 applies the point Pout with a voltage that is alternately turned ON or OFF at the flashing frequency. Because the switching element TR1 is in a connection state, when the control circuit 4 outputs the command signal to the voltage application circuit 2 to apply the voltage that causes the LEDs to be lighted, the LEDs, or the lamp in the direction indicator, is lighted. In this case, a pulse duration of the voltage when the LEDs are turned ON is set, such that the human eye can sufficiently perceive the light from the LEDs, because the LEDs need to be lighted as the lamp of the direction indicator.

When the voltage for lighting the LEDs at the flashing frequency is applied to the point Pout, respective currents flow through the LED arrays (in directions indicated by dotted arrows in FIG. 3B), so that the LED in each LED array is lighted. It should be noted that resistances X1 to X4 of the resistance elements 5 differ from one another, but it is necessary for their differences to be sufficiently decreased, in order to suppress the variations in the respective luminance of the LEDs in the LED arrays. In addition, it is also necessary for the grounded resistance element to have a sufficiently large resistance, so that currents hardly flow through the LED arrays when the switching element TR1 is in a disconnection state.

Figures 4A, 4B, 4C:
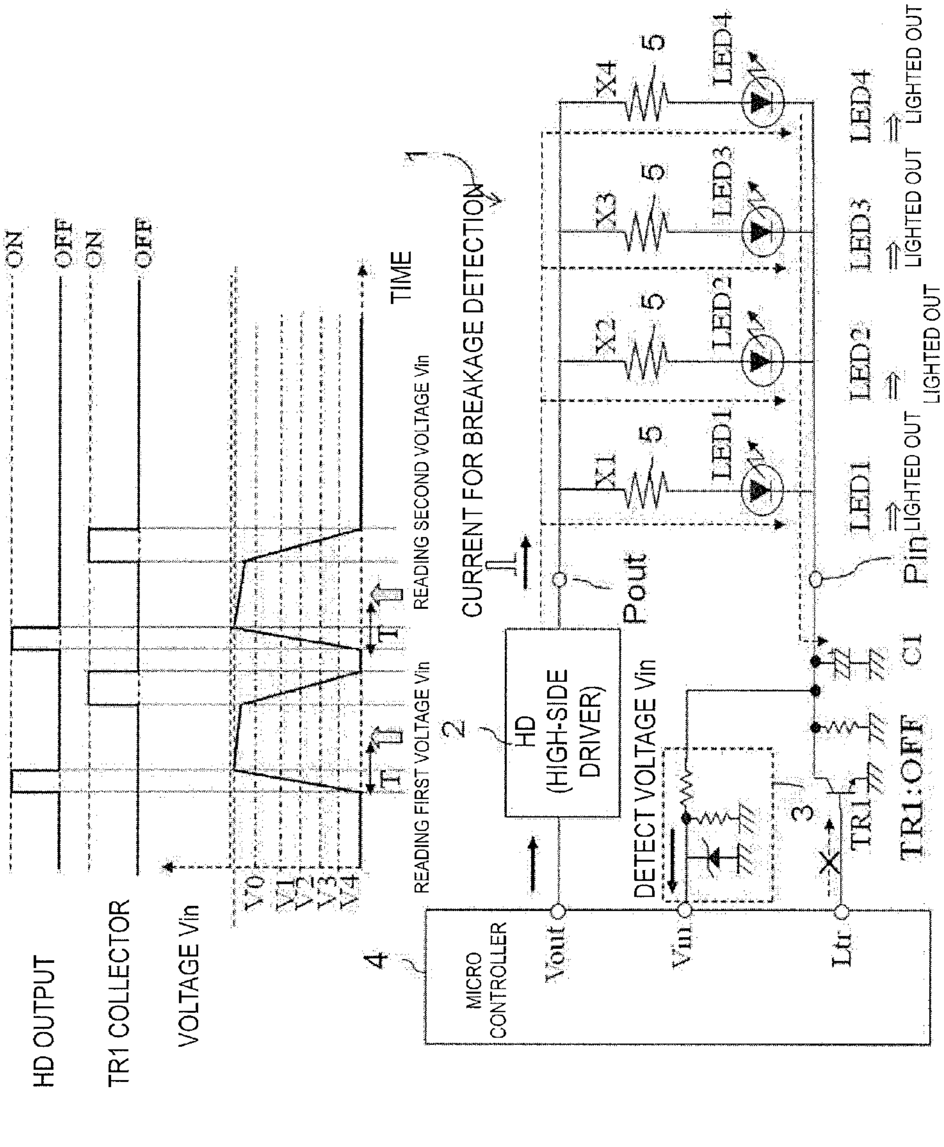
FIG. 4A is a timing diagram of a pulse signal and the switching element in the control device according to the first embodiment of the present invention which is applied for detecting any breakage to the direction indicator when the control device does not detect any breakage of each LED.
FIG. 4B is a diagram of a waveform of a voltage Vin and a timing of reading it.
FIG. 4C is an explanatory diagram of a breakage detection operation of the circuit in the control device.

Next, a description will be given of timing of a pulse signal and the switching element TR1 in a direction indicator and an operation of the control device 1 when a breakage detection operation is performed, with reference to FIGS. 4A and 4B. In FIGS. 4A and 4B, no LEDs are broken. The control circuit 4 first turns off the terminal Ltr, thereby disconnecting the switching element TR1. As a result, the control device 1 is configured to feed only small amounts of currents through the LED arrays until the capacitor C1 is entirely charged, even if a voltage applied to the point Pout.

In order to detect a breakage of each LED, the control circuit 4 outputs a command signal to the voltage application circuit 2 to apply a voltage for breakage detection. In response to the command signal, the voltage application circuit 2 applies the point Pout with the voltage for breakage detection. In this case, the voltage for breakage detection refers to a rectangular wave pulse voltage whose pulse duration is short enough not to cause each LED to be lighted. Strictly speaking, an LED is lighted even when a voltage of a short pulse duration is applied thereto. Therefore, herein, the term “lighted” in the expression “a rectangular wave pulse voltage having a pulse duration that does not cause an LED to be lighted” refers to a state where an LED is “lighted” such that the human eye perceives this light. Therefore, the expression “a rectangular wave pulse voltage having a pulse duration that does not cause an LED to be lighted” refers to a rectangular wave pulse voltage that causes an LED to be lighted such that the human eye cannot perceive this light.

As illustrated in FIG. 4A, the control circuit 4 turns on the terminal Vout, in order to cause the voltage application circuit 2 to apply the point Pout with the voltage for breakage detection, which is a rectangular wave pulse voltage having a pulse duration that causes an LED to be lighted such that the human eye cannot perceive this light. Only while the terminal Vout is kept in an ON state, currents flow through the LED arrays and flow into the capacitor C1 (in directions indicated by dotted arrows in FIG. 4C). In response, as illustrated in FIG. 4B, a voltage in a line connecting each LED and the voltage detection circuit 3 is rapidly increased to a voltage V0 or higher, while the voltage for breakage detection is being applied from the point Pout. In this case, the voltage V0 is a voltage threshold that is preset based on the respective resistances X1 to X4 of the resistance elements 5 under the condition of neither of the LEDs being broken.

Because the electric charge starts being discharged from of the capacitor C1 when the voltage for breakage detection applied from the point Pout is turned off, the voltage detected at the terminal Vin is gradually decreased. The control circuit 4 reads the voltage at the terminal Vin through the voltage detection circuit 3, after a predetermined time period (denoted by T in FIG. 4B) has passed since the terminal Vout is turned on (see arrows in FIG. 4B). The predetermined time period T refers to a time period lapsing after the terminal Vout is turned on or off (FIG. 4B illustrates the former case).

The predetermined time period T may be any given time period, as long as it is terminated after the terminal Vout is turned off and before the switching element TR1 (described later) is turned on. However, the predetermined time period may be terminated immediately after the terminal Vout is turned off, because the voltage at the terminal Vin is not affected by the discharge resistance.

The resistances X1 to X4 of the resistance elements 5 differ from one another, as described above. Therefore, if one of the LEDs is broken, the voltage at the terminal Vin which is rapidly increased only while the terminal Vout is kept in an ON state is decreased by a resistance of the resistance element 5 in an LED array having the broken LED. In this case, the voltage drop across an LED is set sufficiently smaller than that across the resistance element 5. A state where the electric charge is discharged from the capacitor C1 is changed depending on whether or not the LEDs are broken. Therefore, the control circuit 4 can detect presence or absence of a breakage of the LED in each LED array, based on a voltage at the terminal Vin which is read from the voltage detection circuit 3, thereby determining which LED array is broken. In this way, it is possible to control the lighting of the plurality of LEDs, and to detect presence or absence of a breakage of each LED, thereby determining which LED is broken, without lighting the LEDs.

There are cases where discharging the electric charge from the capacitor C1 starts before the electric charge is entirely charged in the capacitor C1, due to the relationship between the capacitance of the capacitor C1 and the output pulse duration. Even in such cases, however, because the discharge resistance is constant, the control circuit 4 can determine the voltage at the terminal Vin.

As illustrated in FIG. 4B, the control circuit 4 reads the voltage from the voltage detection circuit 3 after the predetermined time period passes, and then brings the switching element TR1 into conduction. This operation enables the electric charge in the capacitor C1 to flow into the ground promptly. Consequently, it is possible to discharge the electric charge from the capacitor promptly, thereby detecting presence or absence of a breakage of each LED for a short period. FIG. 4B depicts an example in which after bringing the switching element TR1 into conduction to entirely discharge the electric charge from the capacitor C1, the control circuit 4 disconnects the switching element TR1 again and turns on the terminal Vout immediately, thereby reading a second voltage at the terminal Vin. There is no limitation on how many times voltages at the terminal Vin are read. Voltages at the terminal Vin may be read multiple times, and a breakage of each LED may be detected based on an average of these voltages.

Figures 5A, 5B, 5C:
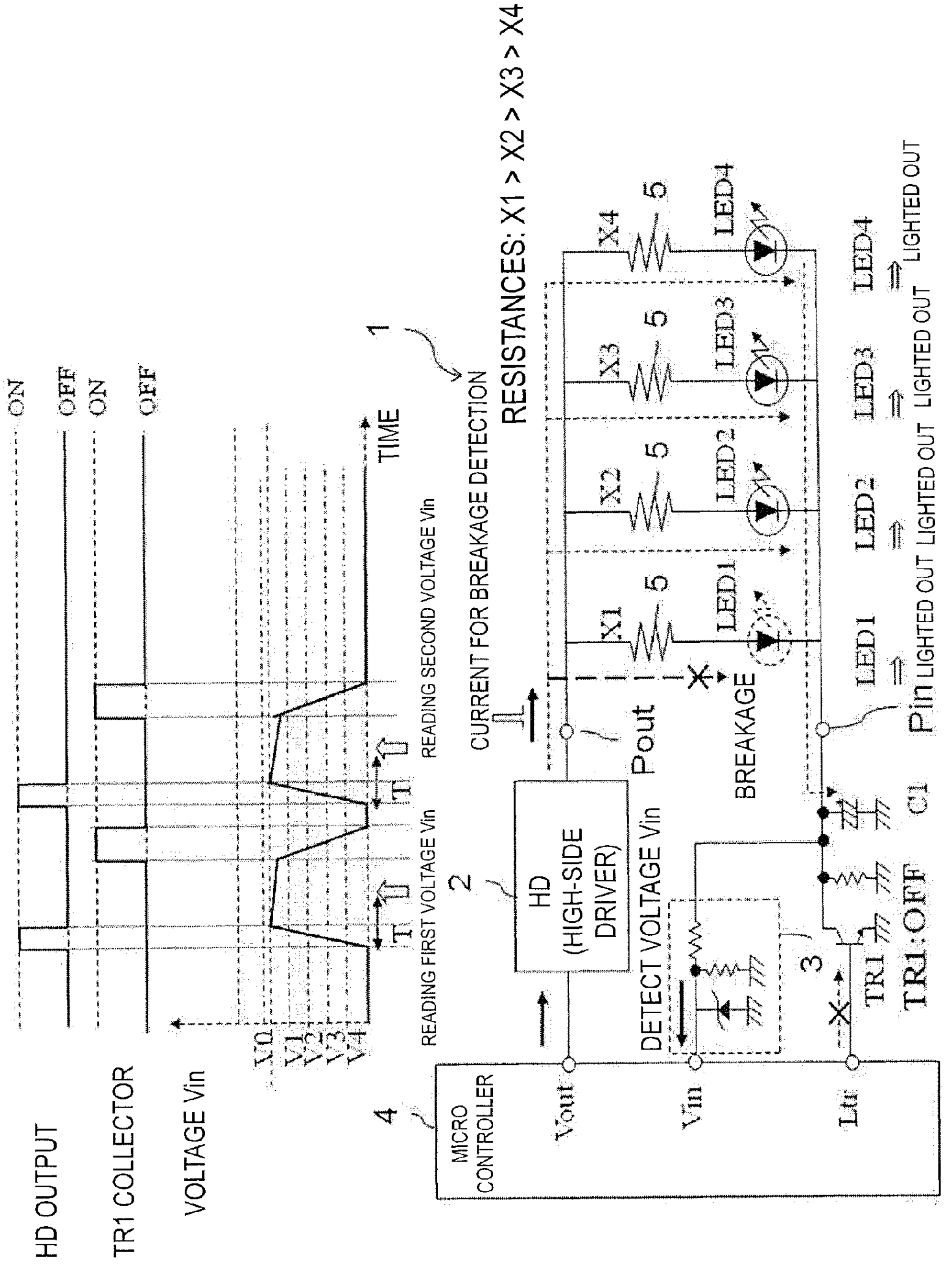
FIG. 5A is a timing diagram of a pulse signal and the switching element in the control device according to the first embodiment of the present invention which is applied for detecting any breakage to the direction indicator when the control device detects a breakage of one of the LEDs.
FIG. 5B is a diagram of a waveform of the voltage Vin and a timing of reading it.
FIG. 5C is an explanatory diagram of a breakage detection operation of the circuit in the control device.

A description will be given in more detail, of a method of determining which LED array is broken, with reference to FIGS. 5A, 5B and 5C. FIGS. 5A, 5B and 5C depict a case where an LED 1 is broken in an LED array with the resistance element 5 having a resistance X1. The resistances have a relationship X1>X2>X3>X4, and the resistance X1 is the largest among them. It should be noted that a description which overlaps that having been given with reference to FIGS. 4A, 4B and 4C will be omitted.

In order to detect a breakage of each LED, the control circuit 4 first turns OFF the terminal Ltr, thereby disconnecting the switching element TR1. Then, the control circuit 4 outputs a command signal to the voltage application circuit 2 to apply a voltage for breakage detection. In response to the command signal, the voltage application circuit 2 applies the point Pout with the voltage for breakage detection.

As illustrated in FIG. 5A, the control circuit 4 causes the voltage application circuit 2 to apply the point Pout with the voltage for breakage detection, which is a rectangular wave pulse voltage having a pulse duration that causes an LED to be lighted such that the human eye cannot perceive this light. Only while Vout is kept in an ON state, currents flow through the LED arrays other than the LED array with the resistance element 5 having the resistance X1 and flow into the capacitor C1 (in directions indicated by dotted arrows in FIG. 5C).

In response, as illustrated in FIG. 5B, a voltage in a line connecting each LED and the voltage detection circuit 3 is rapidly increased to less than a voltage V0 and equal to or more than a voltage V1, while the terminal Vout is kept in an ON state. In this case, the voltage V0 is a voltage threshold that is determined in advance based on the respective resistances of the resistance elements 5 under the condition that neither of the LEDs is broken. The voltage V1 is a voltage threshold that is determined in advance based on the respective resistances of the resistance elements 5 under the condition that only the LED 1 in the LED array with the resistance element 5 having the resistance X1 is broken. Likewise, the voltages V2, V3 and V4 are voltage thresholds determined in advance based on the resistances X2, X3 and X4, respectively.

Figure 6:
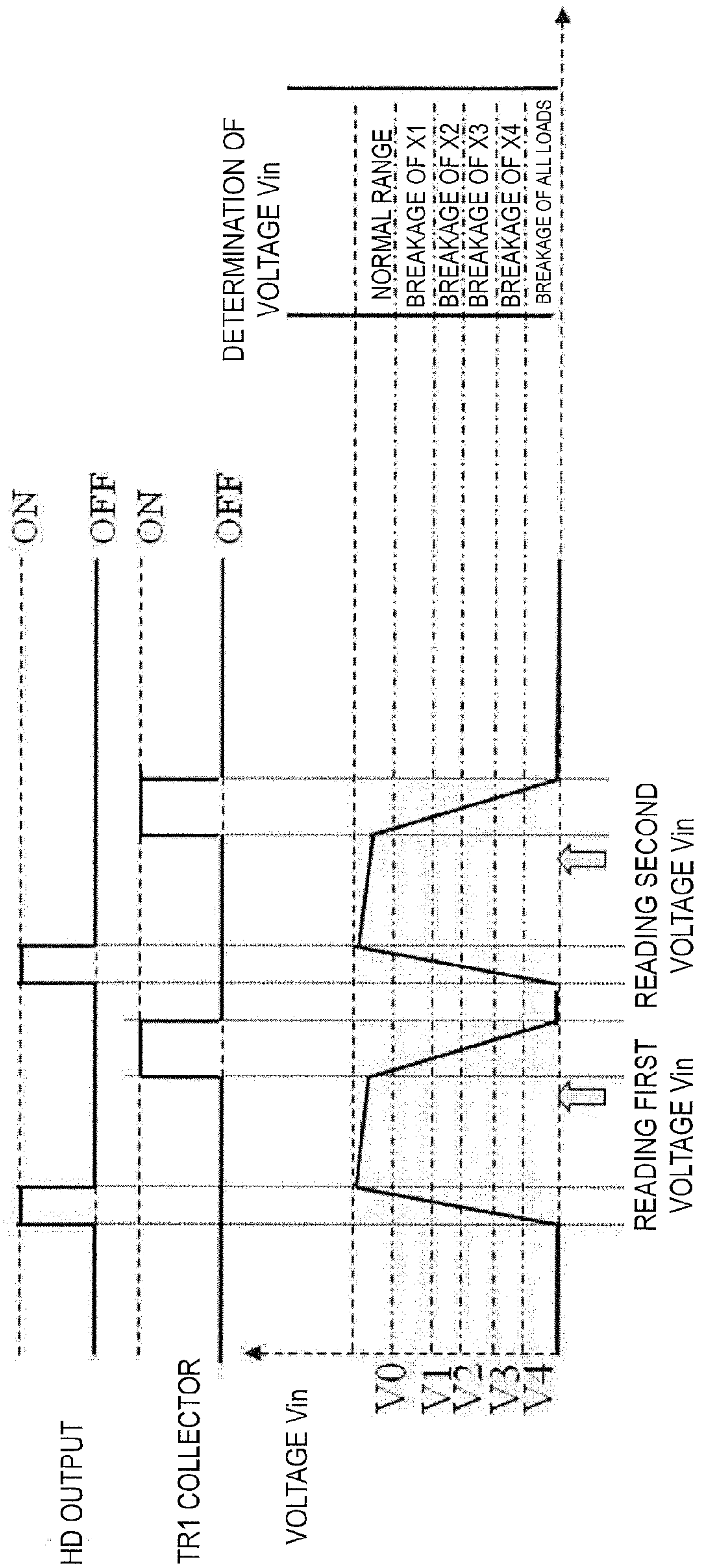
FIG. 6 is an explanatory diagram of a voltage determination in the control device according to the first embodiment of the present invention, when one of the LEDs is broken.

Because the resistance X1 is the largest among the resistances of all the resistance elements 5, the voltage detected at the terminal Vin (voltage Vin) when the LED 1 is broken is lower than that when no LEDs are broken. However, the attenuated degree of this voltage becomes lower than a case where an LED is broken in any other LED array with a resistance element having a different resistance. Therefore, when the LED 1 is broken, the detected voltage Vin has a relationship of V0>Vin>V1. Likewise, as illustrated in FIG. 6, when the LED is broken in the LED array with the second largest resistance X2, the detected voltage Vin has a relationship V1>Vin>V2. When the LED is broken in the LED array with the third largest resistance X3, the detected voltage Vin has a relationship V2>Vin>V3. When the LED is broken in the LED array with the lowest resistance X4, the detected voltage Vin has a relationship V3>Vin>V4.

Accordingly, when reading the voltage Vin and confirming the relationship V0>Vin>V1, the control circuit 4 determines that the LED is broken in the LED array with the resistance element 5 having the resistance X1. When confirming the relationship V1>Vin>V2, the control circuit 4 determines that the LED is broken in the LED array with the resistance element 5 having the resistance X2. When confirming the relationship V2>Vin>V3, the control circuit 4 determines that the LED is broken in the LED array with the resistance element 5 having the resistance X3. When confirming the relationship V3>Vin>V4, the control circuit 4 determines that the LED is broken in the LED array with the resistance element 5 having the resistance X4. When confirming the relationship V4>Vin, the control circuit 4 determines that all the loads are opened.

The control device 4 compares the voltage Vin read from the voltage detection circuit 3 with the voltage thresholds determined in advance based on respective resistances of the resistance elements 5, thereby being able to detect presence or absence of a breakage of the LED in each LED array and to determine which LED array is broken. In this way, it is possible to reliably and promptly detect presence or absence of a breakage of each LED, thereby determining which LED is broken, through the comparison using the voltage thresholds determined theoretically in advance.

The control circuit 4 does not determine which LED is broken, but detect presence or absence of a breakage of the LED in each LED array, based on a change in a voltage read from the voltage detection circuit 3. Consequently, it is possible to detect presence or absence of a breakage of each LED with a simple method.

In the above description, the normal process of lighting the lamp and the breakage detection process are performed separately from each other. However, it is possible to perform the breakage detection process amid the normal process. In more detail, during a period over which a command signal is being outputted to the voltage application circuit 2 to continuously apply a rectangular pulse wave voltage having a pulse duration that causes the LEDs to be lighted, when this rectangular pulse wave voltage becomes 0 V, the control device 4 may output a command signal to the voltage application circuit 2 to apply a rectangular pulse wave voltage having a pulse duration that does not cause the LEDs to be lighted. In this case, it is also possible to detect presence or absence of a breakage of each LED, thereby determining which LED is broken, even while the LEDs are being lighted intermittently or even while the LEDs are being lighted in an output duty cycle which allows the human eye to perceive that each LED is being continuously lighted.

On the other hand, in a keyless entry system, right and left direction indicators may be lighted, in order to show the completion of the lock or unlock of the doors (hereinafter, this lighting is referred to as "answer back."). Amid this answer back, the breakage detection process may be performed.

In the case where a single lamp includes a plurality of LED arrays, when detecting a breakage of one of the plurality of lamp arrays in the lamp, the control circuit 1 may increase the luminance of the LED arrays other than the broken one in the lamp by changing an output duty cycle of the LED. This configuration enables the lamp including the broken LED to temporally maintain the entire luminance until the broken LED is repaired, even when one of the LEDs is broken and loses its luminance.

The control device 1 can detect a failure state of an LED, such as a breakage thereof, and store failure information in a storage device such as an electronic controller. Furthermore, the control device 1 may transmit the failure state to another unit by using a communication function of the electronic controller.

It should be noted that the present invention is not limited to the embodiment having been described, and configurations of the present invention may be contemplated without departing from the scopes described in the individual claims. In more detail, the present invention, in particular, the specific embodiment has been mainly illustrated and described, but those skilled in the art can apply various modifications to the shapes, the materials, the numbers, and the like of the individual detailed components in the above-described embodiments, without departing from the technical spirit and purpose of the present invention. Accordingly, the description, as disclosed above, that limits the shapes and the like is a simply illustrative example for facilitating the understanding of the present invention, and is not intended to limit the present invention. Therefore, descriptions of names of members, the limitations on shapes and the like of which are partially or entirely modified, are included in the present invention.

For example, in this embodiment, the control device is applied to a vehicle, however there is no limitation on applications of the control device. Alternatively, the control device may be applied to other types of vehicles such as ships, or facilities such as houses.

What is claimed is:

1. A control device that controls lighting of a plurality of LEDs and detects a breakage of each LED, the control device comprising:

a plurality of LED arrays connected in parallel to one another, each of the plurality of LED arrays including one or more LEDs connected in series and a resistance element connected in series to the LEDs;

a voltage application circuit that applies a voltage to the plurality of LED arrays;

a switching element disposed between the plurality of LED arrays and a ground;

a voltage detection circuit having an end connected between the switching element and the plurality of LED arrays;

a capacitor having an end connected between the switching element and the plurality of LED arrays, and another end connected to the ground; and a control circuit that controls the voltage outputted from the voltage application circuit and switching of conduction states of the switching element, and reads a voltage from the voltage detection circuit, wherein the resistance elements connected in series to the corresponding LEDs have different resistances from one another, the control circuit renders the switching element be in a connection state, and outputs a command signal to the voltage application circuit to apply the voltage for lighting the LEDs, and the control circuit renders the switching element in a disconnection state, and outputs a command signal to the voltage application circuit to apply a rectangular wave pulse voltage having a pulse duration that does not cause the LEDs to be lighted, to detect presence or absence of breakages of the LEDs in each LED array based on the voltage read from the voltage detection circuit and determine which of the LED arrays is broken.

2. The control device according to claim 1, wherein the control circuit brings the switching element into conduction after reading the voltage from the voltage detection circuit.

3. The control device according to claim 2, wherein the control circuit reads the voltage from the voltage detection circuit after the rectangular wave pulse voltage having the pulse duration that does not cause the LEDs to be lighted becomes 0 V.

4. The control device according to claim 3, wherein the control device detects presence or absence of breakages of the LEDs in each LED array and determines which of LED arrays is broken by comparing the voltage read from the voltage detection circuit with a voltage threshold determined in advance based on respective resistances of the resistance elements.

5. The control device according to claim 3, wherein the control device detects presence or absence of breakages of the LEDs in each LED array based on a change in the voltage read from the voltage detection circuit.

6. The control device according to claim 3, wherein during a period over which the control device outputs a command signal to the voltage application circuit to continuously apply a rectangular pulse wave voltage having a pulse duration that causes the LEDs to be lighted, when the rectangular pulse wave voltage becomes 0 V, the control device outputs the command signal to the voltage application circuit to apply the rectangular pulse wave voltage having the pulse duration that does not cause the LEDs to be lighted.

7. The control device according to claim 3, wherein in the case where the plurality of LED arrays constitute a single lamp, when detecting a breakage of one of the plurality of LED arrays in the single lamp, the control circuit increases luminance of the LEDs constituting the LED arrays other than the broken one in the single lamp.

8. The control device according to claim 2, wherein the control device detects presence or absence of breakages of the LEDs in each LED array and determines which of LED arrays is broken by comparing the voltage read from the voltage detection circuit with a voltage threshold determined in advance based on respective resistances of the resistance elements.

9. The control device according to claim 2, wherein the control device detects presence or absence of breakages of the LEDs in each LED array based on a change in the voltage read from the voltage detection circuit.

10. The control device according to claim 2, wherein during a period over which the control device outputs a command signal to the voltage application circuit to continuously apply a rectangular pulse wave voltage having a pulse duration that causes the LEDs to be lighted, when the rectangular pulse wave voltage becomes 0 V, the control device outputs the command signal to the voltage application circuit to apply the rectangular pulse wave voltage having the pulse duration that does not cause the LEDs to be lighted.

11. The control device according to claim 2, wherein in the case where the plurality of LED arrays constitute a single lamp, when detecting a breakage of one of the plurality of LED arrays in the single lamp, the control circuit increases luminance of the LEDs constituting the LED arrays other than the broken one in the single lamp.

12. The control device according to claim 1, wherein the control device detects presence or absence of breakages of the LEDs in each LED array and determines which of LED arrays is broken by comparing the voltage read from the voltage detection circuit with a voltage threshold determined in advance based on respective resistances of the resistance elements.

13. The control device according to claim 12, wherein during a period over which the control device outputs a command signal to the voltage application circuit to continuously apply a rectangular pulse wave voltage having a pulse duration that causes the LEDs to be lighted, when the rectangular pulse wave voltage becomes 0 V, the control device outputs the command signal to the voltage application circuit to apply the rectangular pulse wave voltage having the pulse duration that does not cause the LEDs to be lighted.

14. The control device according to claim 12, wherein in the case where the plurality of LED arrays constitute a single lamp, when detecting a breakage of one of the plurality of LED arrays in the single lamp, the control circuit increases luminance of the LEDs constituting the LED arrays other than the broken one in the single lamp.

15. The control device according to claim 1, wherein the control device detects presence or absence of breakages of the LEDs in each LED array based on a change in the voltage read from the voltage detection circuit.

16. The control device according to claim 15, wherein during a period over which the control device outputs a command signal to the voltage application circuit to continuously apply a rectangular pulse wave voltage having a pulse duration that causes the LEDs to be lighted, when the rectangular pulse wave voltage becomes 0 V, the control device outputs the command signal to the voltage application circuit to apply the rectangular pulse wave voltage having the pulse duration that does not cause the LEDs to be lighted.

17. The control device according to claim 15, wherein in the case where the plurality of LED arrays constitute a single lamp, when detecting a breakage of one of the plurality of LED arrays in the single lamp, the control circuit increases luminance of the LEDs constituting the LED arrays other than the broken one in the single lamp.

18. The control device according to claim 1, wherein during a period over which the control device outputs a command signal to the voltage application circuit to continuously apply a rectangular pulse wave voltage having a pulse duration that causes the LEDs to be lighted, when the rectangular pulse wave voltage becomes 0 V, the control device outputs the command signal to the voltage application circuit to apply the rectangular pulse wave voltage having the pulse duration that does not cause the LEDs to be lighted.

19. The control device according to claim 1, wherein in the case where the plurality of LED arrays constitute a single lamp, when detecting a breakage of one of the plurality of LED arrays in the single lamp, the control circuit increases luminance of the LEDs constituting the LED arrays other than the broken one in the single lamp.

20. The control device according to claim 1, wherein the LEDs are provided in a vehicle.

* * * * *